(12) United States Patent
Urias et al.

(10) Patent No.: US 11,720,391 B2
(45) Date of Patent: Aug. 8, 2023

(54) EMULATION AUTOMATION AND MODEL CHECKING

(71) Applicant: National Technology & Engineering Solutions of Sandia, LLC, Albuquerque, NM (US)

(72) Inventors: Vincent Urias, Albuquerque, NM (US); Brian P. Van Leeuwen, Albuquerque, NM (US); William M. S. Stout, Albuquerque, NM (US); Michael Kunz, Gretna, NE (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 363 days.

(21) Appl. No.: 17/094,542

(22) Filed: Nov. 10, 2020

(65) Prior Publication Data
US 2022/0147379 A1 May 12, 2022

(51) Int. Cl.
*G06F 9/455* (2018.01)
*G06F 9/48* (2006.01)
*G06F 21/56* (2013.01)
*G06F 16/23* (2019.01)
*G06F 16/28* (2019.01)

(52) U.S. Cl.
CPC ........ *G06F 9/45558* (2013.01); *G06F 9/4881* (2013.01); *G06F 16/2336* (2019.01); *G06F 16/289* (2019.01); *G06F 21/566* (2013.01); *G06F 2009/45562* (2013.01); *G06F 2009/45595* (2013.01)

(58) Field of Classification Search
CPC ............... G06F 9/45558; G06F 9/4881; G06F 16/2336; G06F 16/289; G06F 21/566; G06F 2009/45562; G06F 2009/45595; G06F 2009/4557; G06F 21/53
USPC .............................................................. 718/1
See application file for complete search history.

(56) References Cited

U.S. PATENT DOCUMENTS

| | | | |
|---|---|---|---|
| 2016/0099951 A1* | 4/2016 | Kashyap | G06F 21/564 726/23 |
| 2017/0054754 A1* | 2/2017 | Saher | G06F 21/53 |
| 2017/0093910 A1* | 3/2017 | Gukal | H04L 63/1416 |
| 2017/0171244 A1* | 6/2017 | Vissamsetty | H04L 63/1425 |
| 2017/0223037 A1* | 8/2017 | Singh | H04L 63/1441 |
| 2018/0210745 A1* | 7/2018 | Raheja | G06F 9/5077 |

(Continued)

*Primary Examiner* — Kenneth Tang
(74) *Attorney, Agent, or Firm* — Yee & Associates, P.C.

(57) ABSTRACT

A method of automating emulations is provided. The method comprising collecting publicly available network data over a predefined time interval, wherein the collected network data might comprise structured and unstructured data. Any unstructured data is converted into structured data. The original and converted structured data is stored in a database and compared to known network vulnerabilities. An emulated network is created according to the collected network data and the comparison of the structured data with known vulnerabilities. Virtual machines are created to run on the emulated network. Director programs and guest actor programs are run on the virtual machines, wherein the actor programs imitate real user behavior on the emulated network. The director programs deliver task commands to the guest actor programs to imitate real user behavior. The imitated behavior is presented to a user via an interface.

27 Claims, 6 Drawing Sheets

(56) References Cited

U.S. PATENT DOCUMENTS

| | | | | |
|---|---|---|---|---|
| 2019/0207971 | A1* | 7/2019 | Sharfuddin | G06F 9/445 |
| 2020/0137097 | A1* | 4/2020 | Zimmermann | G06F 21/6218 |
| 2020/0301727 | A1* | 9/2020 | Aronov | G06F 9/45558 |
| 2020/0389469 | A1* | 12/2020 | Litichever | H04L 63/029 |
| 2021/0344690 | A1* | 11/2021 | Sharifi Mehr | G06F 16/25 |

* cited by examiner

EMULATION AUTOMATION AND MODEL CHECKING

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The disclosure relates generally to network monitoring, and more specifically to automatically create models of networks that can be used to monitor activity across a network to assess potential risks to the network.

2. Description of the Related Art

Emulation is a process of mimicking the outwardly observable behavior of a target. In computer science, the emulation is achieved by duplicating every aspect of an original devices behavior, allowing existing software to run on the emulated system without any further modification. In the software industry, an emulator can be an effective tool for testing, especially tracking device activities and analyzing how software interacts with underlying hardware or a combination of hardware and software. Emulation also enables more powerful hardware to imitate older hardware for backward compatibility.

Accordingly, an emulated environment created must be realistic and credible in order to carry out its function. Therefore, it is necessary to identify the breadth, scope and location of where the emulation will be placed when creating an emulation environment.

Therefore, it would be desirable to have a method and apparatus that take into account at least some of the issues discussed above, as well as other possible issues.

SUMMARY

An illustrative embodiment provides computer-implemented method of automating emulations. The method comprising collecting publicly available network data over a predefined time interval, wherein the collected network data might comprise structured and unstructured data. Any unstructured data in the collected network data is converted into structured data. The structured data is stored in a database, including both structured data originally in the collected network data and structured data converted from unstructured data in the collected network data. The stored structured data is compared to known network vulnerabilities, and an emulated network is created according to the collected network data and the comparison of the stored structured data with known vulnerabilities. A number of virtual machines are then created to run on the emulated network. A number of director programs and guest actor programs are run on the virtual machines, wherein the actor programs imitate real user behavior on the emulated network. The director programs deliver task commands to the guest actor programs to imitate real user behavior. The imitated behavior is presented to a user via an interface.

Another illustrative embodiment provides a system for automating emulations. The system comprises a storage device configured to store program instructions and one or more processors operably connected to the storage device and configured to execute the program instructions to cause the system to: collect publicly available network data over a predefined time interval, wherein the collected network data might comprise structured and unstructured data; convert any unstructured data in the collected network data into structured data; store the structured data in a database, including both structured data originally in the collected network data and structured data converted from unstructured data in the collected network data; compare the stored structured data to known network vulnerabilities; create an emulated network according to the collected network data and the comparison of the stored structured data with known vulnerabilities; create a number of virtual machines to run on the emulated network; run a number of director programs on the virtual machines; run a number of guest actor programs on the virtual machines, wherein the actor programs imitate real user behavior on the emulated network; deliver, by the director programs, task commands to the guest actor programs to imitate real user behavior; and present the imitated behavior to a user via an interface.

Another illustrative embodiment provides a computer program product for automating emulations. The computer program product comprises a computer-readable storage medium having program instructions embodied thereon to perform the steps of: collecting publicly available network data over a predefined time interval, wherein the collected network data might comprise structured and unstructured data; converting any unstructured data in the collected network data into structured data; storing the structured data in a database, including both structured data originally in the collected network data and structured data converted from unstructured data in the collected network data; comparing the stored structured data to known network vulnerabilities; creating an emulated network according to the collected network data and the comparison of the stored structured data with known vulnerabilities; creating a number of virtual machines to run on the emulated network; running a number of director programs on the virtual machines; running a number of guest actor programs on the virtual machines, wherein the actor programs imitate real user behavior on the emulated network; delivering, by the director programs, task commands to the guest actor programs to imitate real user behavior; and presenting the imitated behavior to a user via an interface.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that emulation can be an effective tool for cyber security analysis, testing and evaluation of systems, failure analysis, reliance testing, training, tracking device activities, and analyzing how software interacts with underlying hardware or a combination of hardware and software. Emulation can be thought of as infrastructure in code to provide computing environments on cloud platforms on demand in a portable way.

The illustrating embodiments also recognize and take into account that when creating deception networks for emulation, it is necessary to identify the breadth, scope, and location of where the deception will be placed. This emulation generation process can be laborious due to the scale of networks, devices, and system heterogeneity.

The illustrative embodiments also recognize and take into account that open source intelligence (OSINT) is large and there are challenges to handling it efficiently and effectively. Therefore, it is beneficial for OSINT to not only consider as much information as possible but to also have techniques and resources to ensure high quality collection, processing, and analysis. Some of the challenges include unstructured information and data source reliability.

The illustrative embodiments provide a method of creating a network emulation environment automatically through OSINT gathering as well as internal available data such as network configurations, internal trace routes, internal service identification, and network device activity data to create a plausibly constant environment. This environment can be based off information an adversary could gather from external, open sources. Director programs are used to direct tasks performed by actor programs that simulate real user activity vis-a-vis guest software operating on virtual machines within the emulation environment.

The illustrative embodiments employ mechanisms that can dynamically modify cloned material or even create new material based on open information about the agency, and/or intelligence gathered from an adversary's background (e.g., a known Advanced Persistent Threat (APT)) or observation of their actions. The content generated may manifest in documents, users, real-time actuation (emailing, web-browsing, and typing), etc. DevOps is a set of practices to automate and integrate processes of software development (Dev) with information technology (IT) operations (Ops) to increase the speed and reliability of building, testing, and releasing software. As the computing community moves more in the direction of DevOps, the ability of the illustrative embodiments to create environments on the fly for quality testing, etc., can be thought of as unit testing an enterprise.

Figure 1:
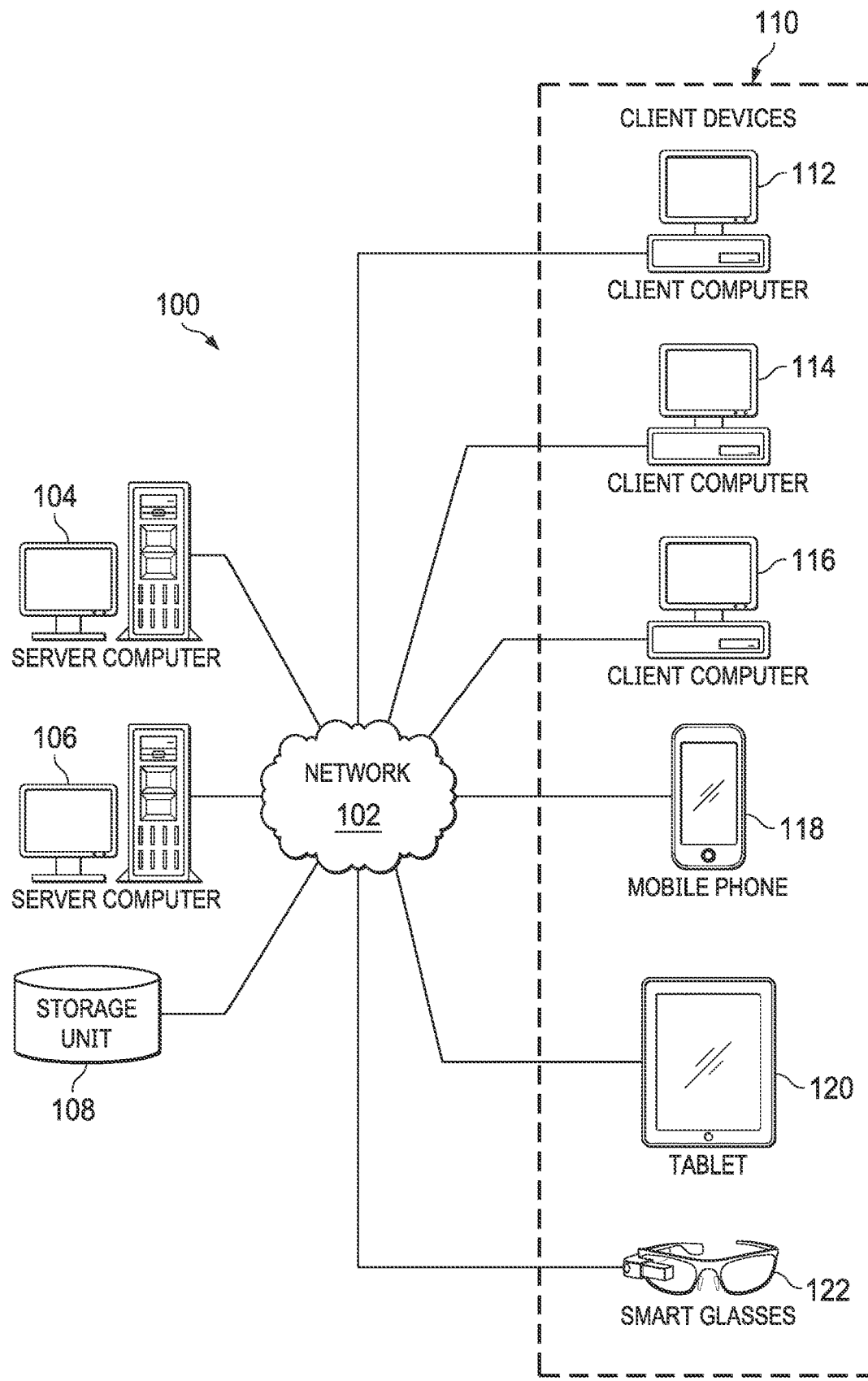
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of Things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
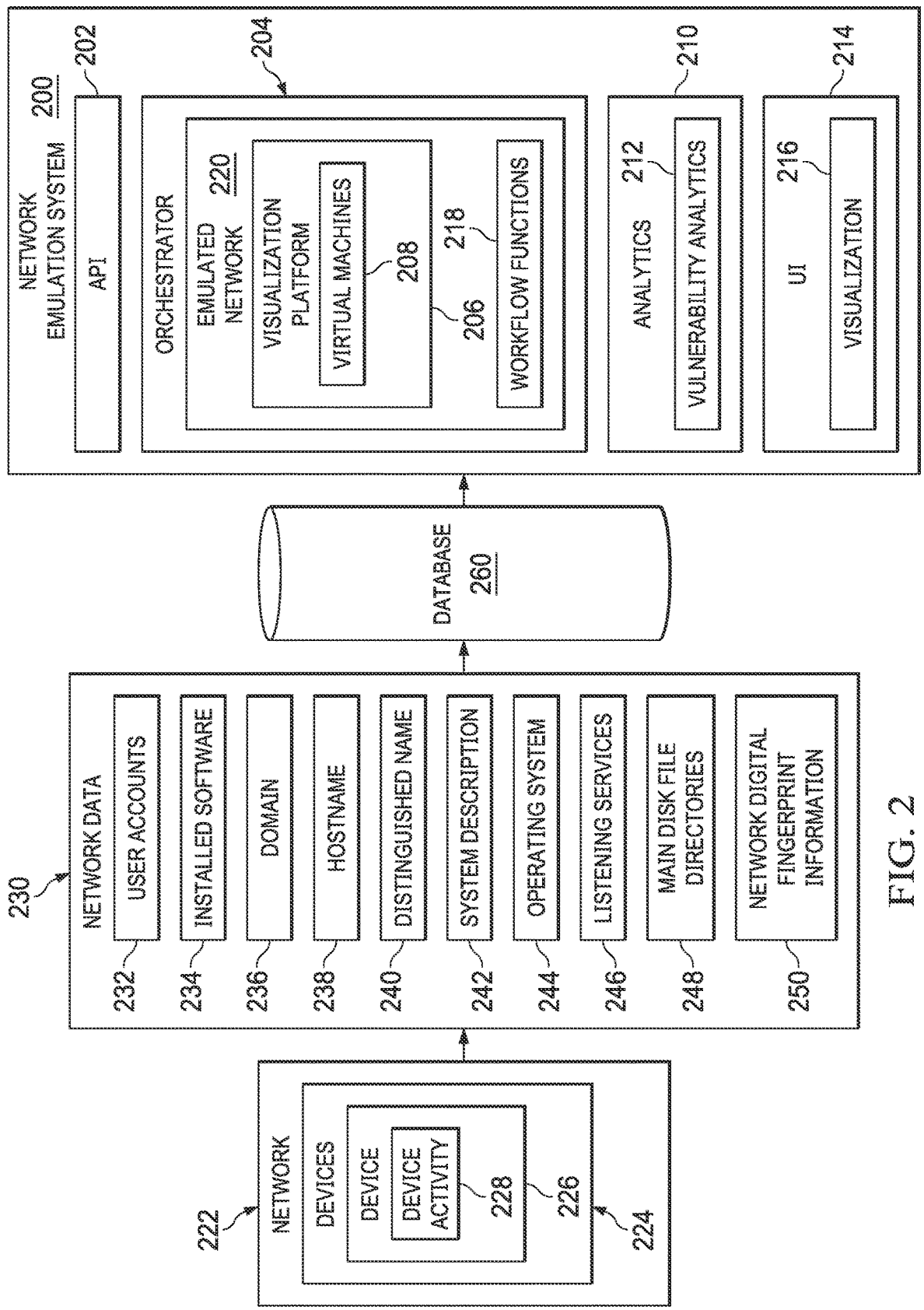
FIG. 2 depicts a block diagram of a network emulation system in accordance with illustrative embodiments.

FIG. 2 depicts a block diagram of a network emulation system in accordance with illustrative embodiments. Emulation system 200 can be implement using one or more server and client computer systems in FIG. 1. Emulation system 200 provides a capability to transform data from disparate sources to imitate user behavior and analyze digital fingerprints of a network 222.

Network 222 might comprise a number of devices 224. Each device 226 among devices 224 has associated device activity 228, which might comprise communication with other devices 224 within network 222 as well as communication with devices and third parties (not shown) outside network 222.

Network data 230 might be collected from diverse publicly available data sources. Network data 230 might comprise User Accounts 232, Installed software 234, Domain 236, Hostname 238, Distinguished name 240, System description 242, Operating system 244, Listening service 246, Main disk file directories 248, and Network digital fingerprint information 250. Network data 230 might be collected on a predefined frequency, for example, on hourly basis, semi-daily basis or daily basis.

Network digital fingerprint information 250 might reflect the status and traffic of the network and the entities in the network. Network digital fingerprint information 250 might include, for example, exposed ports, running network services, passive and active Domain Name System (DNS) names and IP addresses, certificate information, email addresses, active scanning tools to fingerprint externally facing services, geolocation, WHOIS registration data, agency identity, remote access capabilities, unpatched vulnerabilities in applications and operating systems, or applications used by an agency.

Network data 230 might include any public information available on the Internet or in the network. Because of the diverse data sources, the collected network data 230 might be unstructured data and requires further normalization through data processing techniques, for example, data mining, natural language processing, text analytics, or other machine learning/deep learning models. The normalization of the varied data sources might comprise the creation of a grammar (or a common information model) wherein fields and data from the differing sources that have the same context can be combined. For example, an IP address field may be referred to differently depending on the application source providing the data; the networking monitoring program Bro labels the field as "IP source," the networking monitoring specification NetFlow labels the field as "IP src," and a firewall Access Control List (ACL) may use the label "IPSRC." Normalization of these label to a common nomenclature provides ease of data correlation and search. Additionally, such normalization can enumerate a large variety of attributes that can be used to define an endpoint and what can be exploited for downstream processing (e.g., such as Kerberos ID to infer both user and identify information in active directory). This normalization can also be thought of as developing a Common Information Model (CIM).

The collected data might come from authoritative, reviewed, and trusted sources, for instance, official documents, scientific reports, or reliable communication. In addition, network data 230 might also be anchored with authoritative sources of information to enrich or test the validity of untrusted sources.

Database 260 is used to store user data collected from publicly available data sources and has the capability to create multiple pipelines for each data type to parse and process the data. Database 260 might also create schemas similar to the schemas of the structured datasets to convert unstructured data into a structured format in accordance with the specification of the database 260 so that the data can be accepted and uploaded promptly. Database 260 might offer a columnar storage format or row-based storage formats, but preferably, store datasets in columnar storage format for better efficiency. In addition, database 260 might be a multi-model database based on non-SQL storage objects.

Network emulation system 200 automatically creates an emulated network 220 to emulate real network 222 using network data 230. Network emulation system 200 creates workflow functions 218 that can run on a number of virtual machines (VMs) 208 on emulated network 220. Orchestrator 204 uses VMs 208 to construct an emulation on a virtualization platform 206 based on network data 230. Virtualization platform 206 is a tool for launching and managing VMs 208 and network topology used across an emulated network. It can launch and manage VM-based experiments, set up complex virtual network topologies in a repeatable manner, and can integrate real hardware with virtual experiments. Workflow function 218 interacts with the Virtualization Platform 206 and database 260 via an application programming interface (API) 202 to deliver task commands for imitating real user behaviors in VMs 208.

Emulation system 200 is capable of emulating real network 222 and real user behavior on emulated network 220 by distributing task commands through workflow functions 218 to guest programs on VMs 208 across the emulated network 220. The automated emulation might comprise, for example, running an application on a virtual machine and imitating real user behavior such as computer mouse click or keyboard typing. Emulation system 200 can test the emulated network 220 for correctness (e.g., reachability between network devices, permitted and denied data flows, etc.), as well as employing tools to confirm device configurations at the system level for incorrect configurations, inefficient combinations, possible policy problems, ACL conflicts, etc.

Emulation system 200 can generate file history and system logs based on collected data to create a more realistic environment. For example, emulation system 200 might deploy a method of Google Chrome® history modification, which randomly selects a set of collected URL strings to generate a history file from within Google Chrome®. The history file is also modified with new data/time stamps from a given period of times.

Analytics (analysis engine) 210 might be used to perform various analysis on the collected data and evaluate network security through scanning of post-processed network data by vulnerability analytics 212. User Interface (UI) 214 provides visualization 216 of emulation system 200. UI 214 might also allow user to view analytic report generated by analytics 210. Additionally, UI 214 can be used to modify (e.g., delete, change, create) the emulation system 200. This modification might comprise modifying cloned material or even creating new material based on information stored in database 260. The content created might be manifested in documents, users, or real-time actuation, for example, emailing, web-browsing, and typing, etc.

Emulation system 200 can be implemented in software, hardware, firmware or a combination thereof. When software is used, the operations performed by emulation system 200 can be implemented in program code configured to run on hardware, such as a processor unit. When firmware is used, the operations performed by emulation system 200 can be implemented in program code and data and stored in persistent memory to run on a processor unit. When hardware is employed, the hardware might include circuits that operate to perform the operations in emulation system 200.

In the illustrative examples, the hardware might take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein a processor is comprised of hardware circuits such as those on an integrated circuit that respond and process instructions and program code that operate a computer. When a number of processors execute instructions for a process, the number of processors is one or more processors can be on the same computer or on different computers. In other words, the process can be distributed between processors on the same or different computers in a computer system. Further, the number of processors can be of the same type or different type of processors. For example, a number of processors can be selected from at least one of a single core processor, a dual-core processor, a multi-processor core, a general-purpose central processing unit (CPU), a graphics processing unit (GPU), a digital signal processor (DSP), or some other type or processor.

These components can be located in a computer system, which is a physical hardware system and includes one or more data processing systems. When more than one data processing system is present in the computer system, those data processing systems are in communication with each other using a communications medium. The communications medium can be a network. The data processing systems can be selected from at least one of a computer, a server computer, a tablet computer, or some other suitable data processing system.

Emulation system 200 can be applied to a variety of use cases. For example, system 200 can be used to collect software packages of varying versions and save the collected packages to an offline repository. This allows the emulation system 200 to deploy potential vulnerable packages to users within the emulated network environment 220 for testing purpose.

Figure 3:
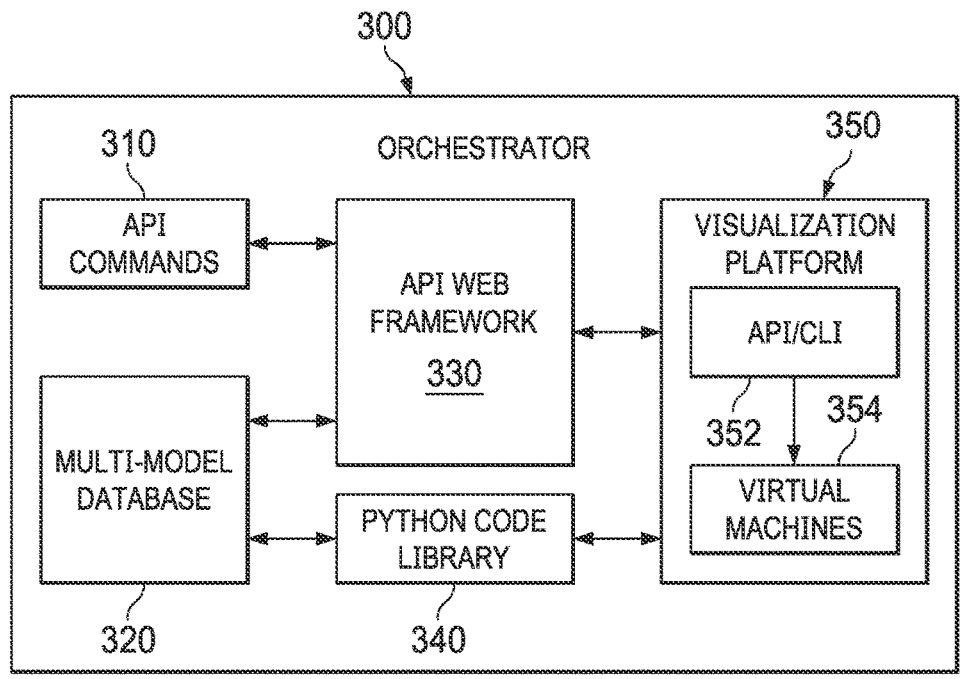
FIG. 3 depicts a block diagram of an orchestrator in accordance with illustrative embodiments.

FIG. 3 depicts a block diagram of an orchestrator in accordance with illustrative embodiments. Orchestrator 300 might be an example of orchestrator 204 shown in FIG. 2.

Orchestrator 300 interacts with the Virtualization Platform 350, which runs all virtual machines 354 on the emulated network environment. The Virtualization Platform 350 facilitates the task commands traffic by providing a command line interface (CLI)/API 352 to receive upstream task commands and deliver them to the downstream virtual machines 354 for execution to imitate real user behaviors.

API commands 310 generated with information from observed real user behavior interacts with an API Web Framework 330 to deliver task commands to a downstream component. The API Web Framework 330 is a webserver micro-framework that enables efficient implementation of a Representational State Transfer (REST) API or website. The API Web Framework 330 runs API endpoints that interact with the Virtualization Platform 350 and a multi-modal database 320 via Python code functions. The API Web Framework 330 is also capable of establishing hypertext transfer protocol (HTTP) endpoints to listen to and receive text-based log information for tracking and logging executions in the emulated environment.

The multi-model database 320 provides the ability to store Non-SQL storage objects. The multi-model database 320 utilizes JavaScript Object Notation (JSON) objects to record the state of users, VMs, and events across the emulation environment. It is can be used to make visualizations of realistic interaction between VMs, events, and users by enabling graph like queries allowing easy traversal of executed events and user interactions.

Python code library 340 is leveraged to execute flows across the Virtualization Platform 350. Python code library 340 provides a library of Python functions and objects that can be used for interaction between the multi-model database 320, the API Web Framework 330, and the Virtualization Platform 350. Python code library 340 also utilizes API/CLI 352 to interact with the Virtualization Platform 350. The Python code library 340 also enables data validation techniques and settings management through Python code type annotations, enforcing type hints at runtime, which is an effective tool for tracking and standardizing data models across the emulation environment.

Figure 4:
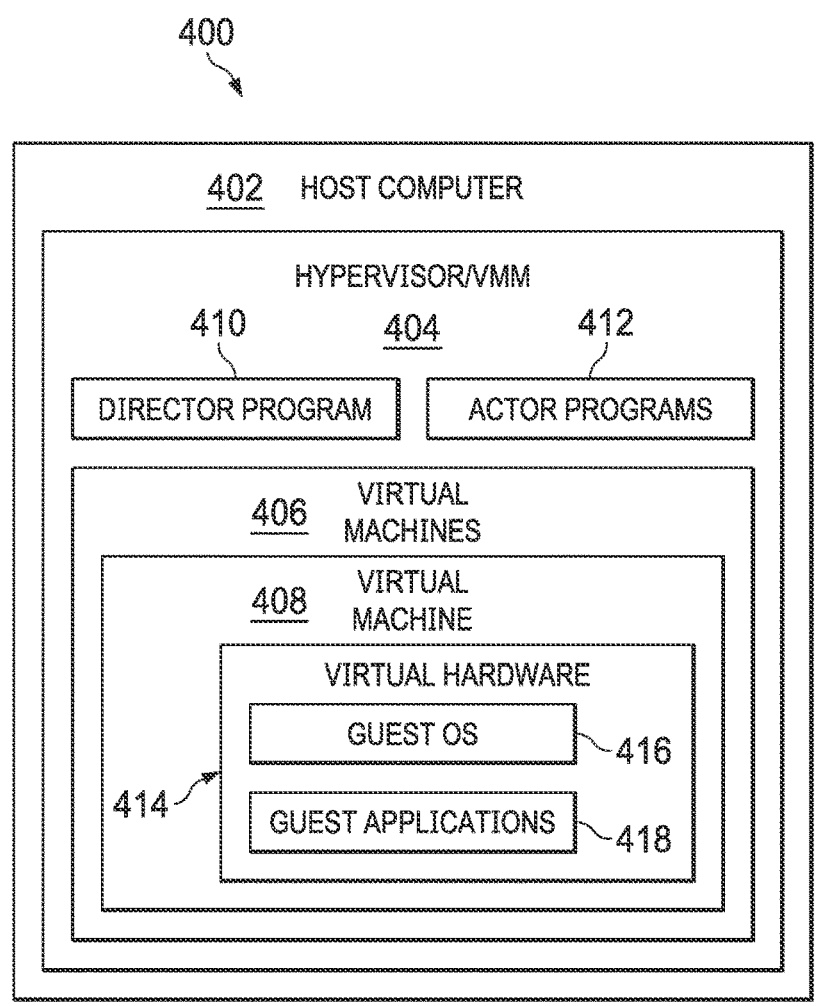
FIG. 4 depicts a block diagram of a virtual machine in accordance with illustrative embodiments.

FIG. 4 depicts a block diagram of a virtual machine in accordance with illustrative embodiments. System 400 comprises a host computer infrastructure 402 on which VMs 406 run. VMs 406 might be examples of VMs 208 in FIG. 2. The host computer infrastructure 402 is able to host a number of VMs 406. Each VM 408 among the number of VMs 406 comprises virtual hardware 414 on which run a guest operating system (OS) 416 and a number of guest applications 418.

Hypervisor/virtual machine monitor (VMM) 404 creates and runs VMs 406 on host computer infrastructure 402. VMM 404 might be implements in software, firmware, or hardware. VMM 404 allows one host computer 402 to support multiple guest VMs 406 by virtually sharing its resources such as memory and processing. The VMM 404 can isolate the guest applications 418 running in a VM 408 and can access VM states such as CPU state (e.g., registers), memory, input/output (I/O) device state simulated in the virtual hardware 414.

Director program 410 runs on VM 408 and delivers actor behavior through a number of actor programs 412. Actor programs 412 are built on top of the code base of director program 410 and imitate real user behavior on guest applications 418. Director program 410 can issue keyboard and mouse commands via virtual network computing/remote framebuffer playback to specific guest applications 418 running within the network. The task commands can perform desired tasks either through direct keyboard and mouse position clicks or via Open Source Vision Library (OpenCV).

OpenCV gives director program 410 the functionality to do picture comparison. Through OpenCV, director program 410 can take a screen capture of a guest machine and compare it with a given image to determine if the given image exists. If the given image does exist, director program 410 then determines where to send the mouse curser and where to click. This functionality gives director program 410 the ability to orchestrate a wide breath of actor functionality across the emulation environment without running any analytic code on the guest VM 408. This functionality is not only cleaner but leaves the VM 408 forensically intact to further deceive an adversary.

In the illustrate embodiments, the guest actor programs 412 might include, for example Microsoft Word/PowerPoint®/Excel® actor, Skype® actor, Outlook® actor, Google Chrome® Web Search actor, PowerShell® actor, and domain/login actor. For instance, the Word/PowerPoint®/Excel® actors are designed to perform imitated user actions on an emulated guest machine in real time. These actors are able to open, create, save, and close files. The code takes input from the host and types content within the guest session. This content can be preconfigured and ingested into the program in a variety of formats, e.g., comma separated value (CSV) file formats for Excel®. The PowerPoint® actor has copy/paste functionality that is injected by the host. All of this functionality not only gives a guest a more "lived-in" feel but provides real time actions within the emulated environment.

A Skype® actor might preform conversations across guests via Skype® for Business or other similar video/voice conference application. The actor is able to open Skype®, start conversations with other guests, reply to conversations, minimize conversations, and close conversations. Conversation text is ingested by the actor and given to each guest. Guest conversations might be queued to ensure the receiving guest can respond before the current guest continues the conversation. This conversational behavior not only creates social networks but adds legitimacy to the live environment with real time guest interactions.

As another example, an Outlook® actor might send and reply to emails from another guest machine. The actor can open Outlook®, create/send new emails, reply to emails, and close Outlook®. The actor ingests inputs such as recipient, subject, and body in order to create or reply to an email. This email communication between guests not only creates interactions but helps build a social network within the emulated environment. These social networks add legitimacy to the simulation environment and can be applied to other email client applications as well.

A search actor might perform generic web searching on a guest VM 408. The actor can open Google Chrome® or other browser programs, perform URL searches, create/delete tabs, and close the browser. The actor ingests a set of provided URLs and performs each query in real time on the guest. This behavior can extend the lived-in feel and supplement an already generated browser history file.

The PowerShell® actor might execute PowerShell® commands in real time on a guest VM 408. The actor can open regular/admin consoles, type/execute commands, and close a session. PowerShell® script execution on a guest allows for vast amounts of versatility when performing tasks. The PowerShell® type/execute input can be modified to accept a large variety of behaviors and actions further extending the lived-in feel of the machine.

The domain/login actor can add an unconfigured image to a domain with a specific user. This code can take in arguments for a domain and user account. All actions can be executed on the guest VM 408 and once complete the guest is restarted. After restart, the VM 408 is logged in to the domain user account and is ready for another actor behavior.

Figure 5:
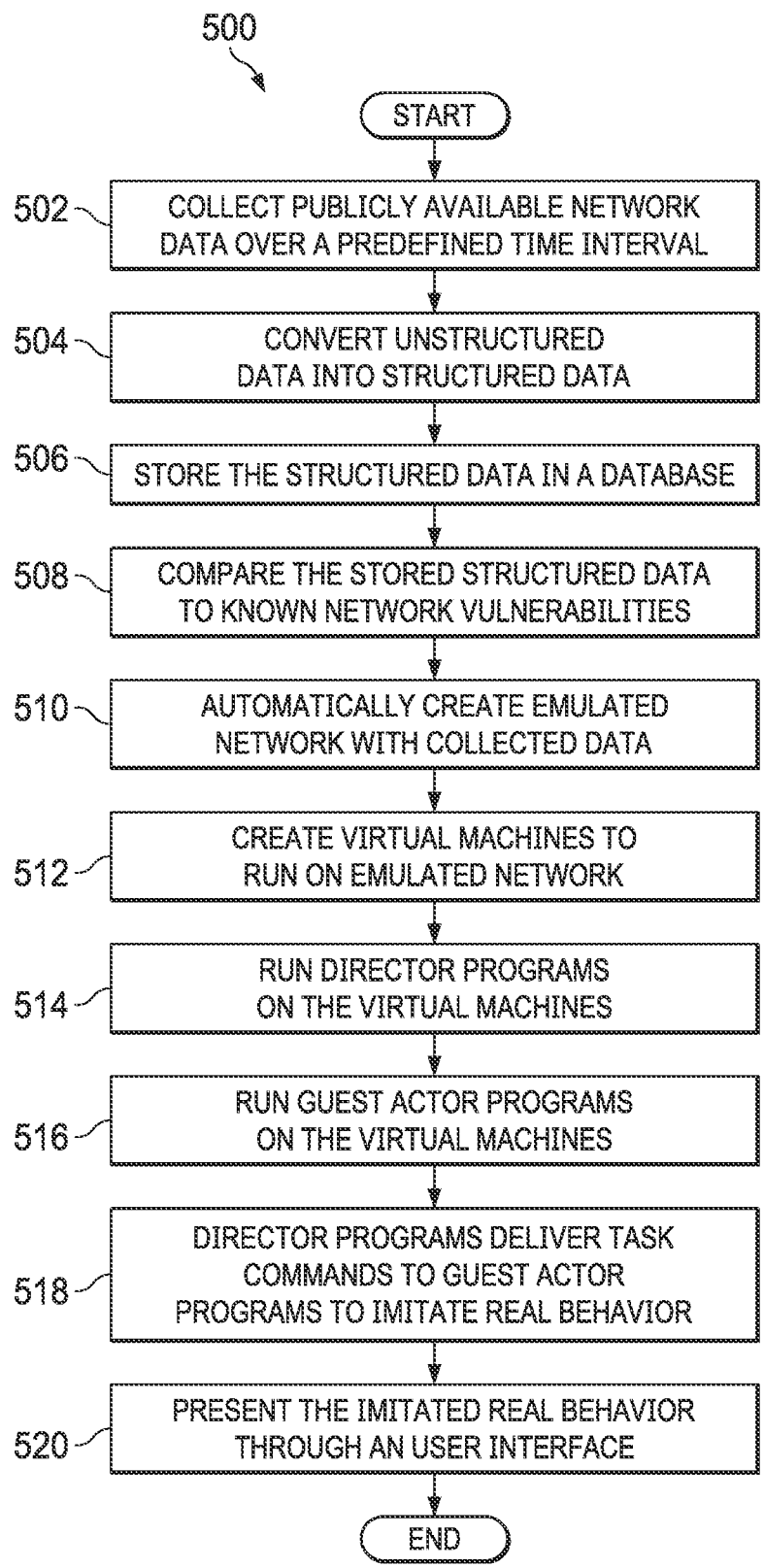
FIG. 5 depicts a flowchart for automated emulation in accordance with illustrative embodiments.

FIG. 5 depicts a flowchart for automated emulation in accordance with illustrative embodiments. Process 500 can be implemented in hardware, software, or both. When implemented in software, the process can take the form of program code that is run by one of more processor units located in one or more hardware devices in one or more computer systems. Process 500 might be implemented in emulation system 200 shown in FIG. 2.

Process 500 begins by collecting publicly available network data over a predefined time interval, wherein the collected network data might comprise structured and unstructured data (step 502). An aggregation service might be created to collect publicly available data from open sources according to the task or objectives. The data collection process might be automatically repeated over the predefined time interval, e.g., hourly or daily.

As the data being processed varies a lot between different sources. The collected data might include structured data and unstructured data with different formats. The collected publicly available data might include, for example, user accounts information, installed software information, domain, hostname, distinguished name, system description, operating system, IP information, listening services, main disk file directories, or network digital fingerprint information.

In this illustrative embodiment, the digital fingerprint information might be used for revealing potential entry points and the size of the target network. Some of the digital fingerprint information might include, for example, exposed ports, running network services, passive and active DNS names and IP addresses, certificate information, email addresses, active scanning tools to fingerprint externally facing services, geolocation, WHOIS registration data, agency identity, remote access capabilities, unpatched vulnerability in applications and operating system, or applications used by an agency.

Any unstructured data in the collected network is converted data into structured data (step 504). Data pipelines might be created for each data type to parse and process the data. Custom code might be used to create schemas similar to the schemas of the structured dataset to massage the data into semi-structured format that a database can accept. By sufficiently transforming unstructured data into structured data, a database might handle a petabyte scale table with billions of partitions and files without difficulty.

The structured data is then stored in a database, including both structured data originally in the collected network data and structured data converted from unstructured data in the collected network data (step 506). The database might have the ability to create multiple data pipelines to read and write data concurrently without the need to ensure data integrity. As the data are uploaded to the database, each dataset can be stored in its own directory with sub-partitions based on data types determined by each dataset. The database might offer the option to store data in columnar storage format or row-based storage formats when querying data. For example, the data storage format might be a columnar storage format that offers more metadata fields to allow quicker data retrieval and querying. The database might be a multi-model database based on non-SQL storage objects.

Process 500 also includes determining security posture of the IP space and the network entities using them by comparing the stored structured data to known network vulnerabilities (step 508). The stored data might be searched for commonly known vulnerabilities by comparing the information given by the scan of a well-known vulnerability database. If there is any vulnerable service present, a user might be informed of it as well as how to mitigate the risks. In addition, an internet-wide scan might be used to inspect IP addresses to search for similar information vulnerability information.

Process 500 automatically creates an emulated network environment with the collected network data according to the comparison of the stored structured data with known vulnerabilities (step 510). Process 500 then creates a number of virtual machines to run on the emulated network environment (step 512).

A number of director programs are run on the virtual machines (step 514), and a number of guest actor programs are also on the virtual machines (step 516). The actor programs imitate real user behavior in the emulated computing environments. The director programs send task commands to the guest actor programs to imitate real user behavior (step 518).

The emulation system presents the imitated behavioral and the effects of the imitated behavior to a user via an interface (step 520). Process 500 then ends.

Process 500 might further include collecting software packages of varying age and saving them to an offline repository. Software packages might include, for example, publicly available packages, custom packages, or modification of existing packages. This internalization process allows deployment of outdated and potentially vulnerable packages to guests within the simulation environment. In some embodiments, a list of software package can be complied, collected, and pushed to a software management intermediate to be installed across guests within the emulation environment.

Figure 6:
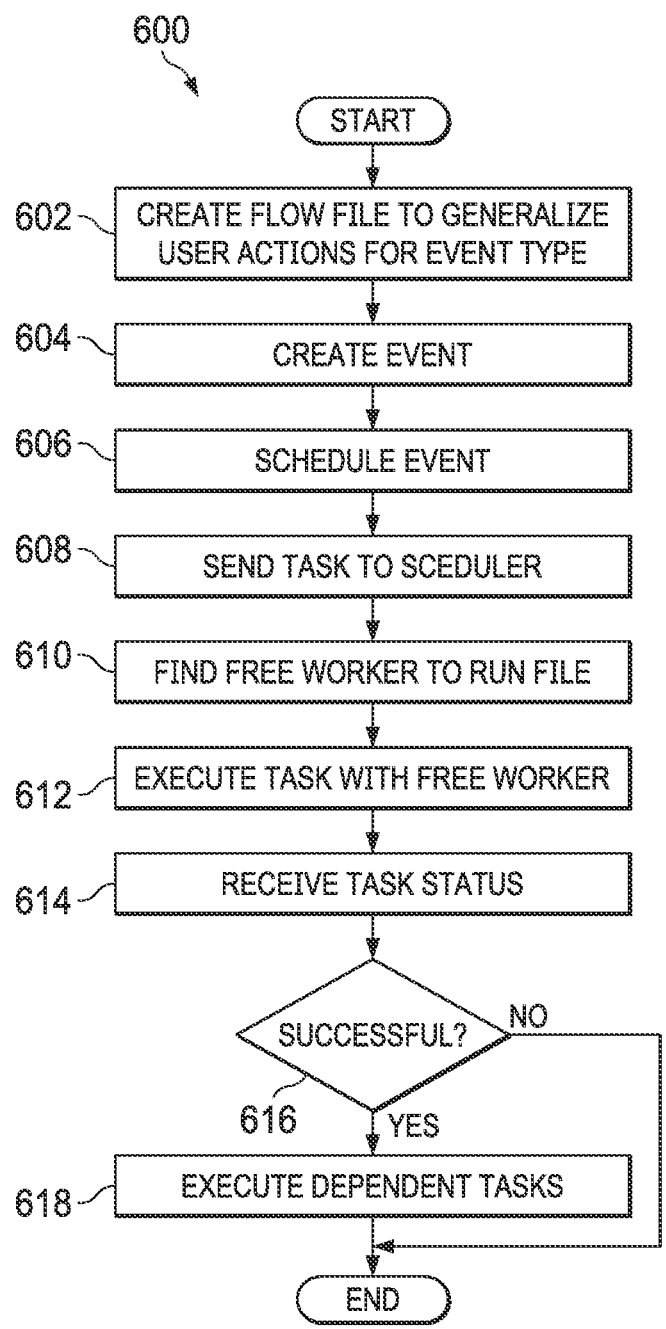
FIG. 6 depicts a flowchart for an emulated event run in accordance with illustrative embodiments.

FIG. 6 depicts a flowchart for an emulated event run in accordance with illustrative embodiments. Process 600 can be implemented in hardware, software, or both. When implemented in software, the process can take the form of program code that is run by one or more processor units located in one or more hardware devices in one or more computer systems. Process 600 might be a detailed example of step 518 shown in FIG. 5.

Process 600 begins by creating a flow file to generalize the actions a user should take for a specified event type (step 602). This flow file defines the Python code functions that need to run to execute that flow. An event is created, wherein the event comprises the specified event type (step 604).

The event is scheduled to run (step 606). Once the time arrives the event is executed by sending the first task of the event to be run by the event scheduler (step 608). The scheduler enables parallel execution of processes in a stable manner. The scheduler can enable execution across a networked cluster, making it distributable. The scheduler also allows following and logging all task executions, facilitating debugging should problems occur.

The scheduler looks for a free worker to run the file (step 610). When a free worker is found, the first task is executed (step 612).

The flow receives the status of the first task from the scheduler (step 614) and determines if the first task is successful (step 616). If successful, dependent tasks are then execute (step 618). If the first task fails, the flow fails, and all other dependent tasks are not executed. Process 600 then ends.

The Orchestrator might enable cleanup tasks to still be run even if some tasks fail so that system resources used by a task such as a VM, can be cleaned and setup for future tasks.

Figure 7:
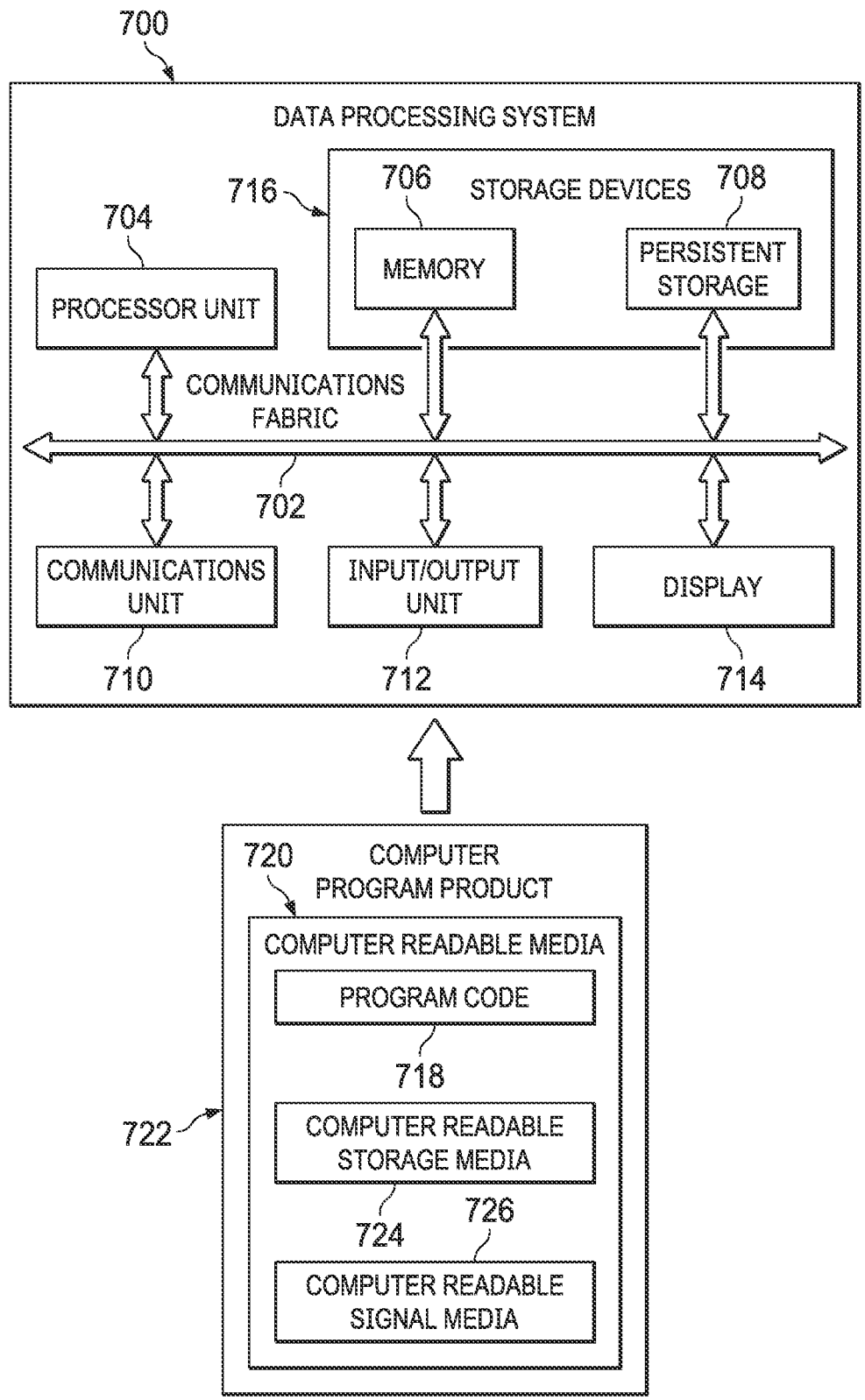
FIG. 7 is a diagram of a data processing system depicted in accordance with an illustrative embodiment.

Turning now to FIG. 7, an illustration of a block diagram of a data processing system is depicted in accordance with an illustrative embodiment. Data processing system 1300 may be used to implement one or more computers shown in FIG. 1 (e.g., client devices 110 and servers 104, 106) and network emulation system 200 in FIG. 2. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation. In an embodiment, processor unit 704 comprises one or more conventional general-purpose central processing units (CPUs). In an alternate embodiment, processor unit 704 comprises one or more graphical processing units (GPUs).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 716, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708. Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718. Computer readable storage media 724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 718 may be transferred to data processing system 700 using computer-readable signal media 726. Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The illustrative embodiments provide method for predicting changes in customer demand. The method comprises collecting subscription data for a number of customers at specified time intervals, wherein each customer is subscribed to one of a number of defined bundles of services. The method further comprises determining any changes in customer bundle subscriptions during a given time interval, and determining metrics for defined customer tasks for subscribed services during the given time interval. From this data, the method simultaneously models, via multimodal multi-task learning, bundle subscription change events and time-to-event for each bundle subscription change. The method then predicts, according the modeling, types and timing of changes in customer bundle subscriptions based on customer service activities. By predicting both the types of changes in bundles subscriptions and the timing of those changes, the illustrative embodiments allow proactive steps to be taken to assist customers in making changes or to mitigate negative changes. Such proactive steps might comprise targeted marketing or incentive to customers or speeding up changes to bundle subscriptions. The anticipatory, proactive steps can provide cost and time savings for both customers and service providers.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of automating emulations, the method comprising:
 using a number of processors to perform the steps of:
  collecting publicly available network data over a predefined time interval, wherein the collected network data might comprise structured and unstructured data;
  converting any unstructured data in the collected network data into structured data;
  storing the structured data in a database, including both structured data originally in the collected network data and structured data converted from unstructured data in the collected network data;
  comparing the stored structured data to known network vulnerabilities;
  creating an emulated network according to the collected network data and the comparison of the stored structured data with known vulnerabilities;
  creating a number of virtual machines to run on the emulated network;
  running a number of director programs on the virtual machines;
  running a number of guest actor programs on the virtual machines, wherein the actor programs imitate real user behavior on the emulated network;
  delivering, by the director programs, task commands to the guest actor programs to imitate real user behavior; and
  presenting the imitated behavior to a user via an interface.

2. The method of claim 1, wherein the publicly available network data comprises at least one of:
 user accounts information;
 installed software information;
 domain;
 hostname;
 distinguished name;
 system description;
 operating system;
 IP information;
 listening services;
 main disk file directories; or
 network digital fingerprint information.

3. The method of claim 2, wherein the network digital fingerprint information comprises at least one of:
 exposed ports;
 running network services,
 passive and active DNS names and IP addresses;
 certificate information;
 email addresses;
 active scanning tools to fingerprint externally facing services;
 geolocation;
 WHOIS registration data;
 agency identity;
 remote access capabilities;
 unpatched vulnerabilities in applications and operating systems; or
 applications used by an agency.

4. The method of claim 1, wherein the database is a multi-model database based on non-SQL storage objects.

5. The method of claim 1, wherein the structured data is stored in the database in a columnar manner.

6. The method of claim 1, wherein collecting the publicly available data comprises:
 collecting software packages of varying versions; and
 storing the software packages to an offline repository.

7. The method of claim 1, wherein the task commands are delivered via at least one of:
 keyboard;
 mouse position clicks; or
 Open Source Computer Vision Library.

8. The method of claim 1, wherein the virtual machines emulate a host and network environment.

9. The method of claim 1, wherein running an actor program comprises:
 creating a file to generalize user actions for a specified event type;
 creating an event, wherein the event comprises the specified event type;
 scheduling the event;
 sending a first task of the event to an event executor;
 executing the first event;
 determining a running status of the event; and
 subsequently executing any dependent tasks only if the first task is successful.

10. A system for automating emulations, the system comprising:
 a storage device configured to store program instructions; and
 one or more processors operably connected to the storage device and configured to execute the program instructions to cause the system to:
  collect publicly available network data over a predefined time interval, wherein the collected network data might comprise structured and unstructured data;
  convert any unstructured data in the collected network data into structured data;
  store the structured data in a database, including both structured data originally in the collected network data and structured data converted from unstructured data in the collected network data;
  compare the stored structured data to known network vulnerabilities;
  create an emulated network according to the collected network data and the comparison of the stored structured data with known vulnerabilities;
  create a number of virtual machines to run on the emulated network;
  run a number of director programs on the virtual machines;
  run a number of guest actor programs on the virtual machines, wherein the actor programs imitate real user behavior on the emulated network;
  deliver, by the director programs, task commands to the guest actor programs to imitate real user behavior; and
  present the imitated behavior to a user via an interface.

11. The system of claim 10, wherein the publicly available network data comprises at least one of:
 user accounts information;
 installed software information;
 domain;
 hostname;
 distinguished name;
 system description;
 operating system;
 IP information;
 listening services;
 main disk file directories; or
 network digital fingerprint information.

12. The system of claim 11, wherein the network digital fingerprint information comprises at least one of:
- exposed ports;
- running network services,
- passive and active DNS names and IP addresses;
- certificate information;
- email addresses;
- active scanning tools to fingerprint externally facing services;
- geolocation;
- WHOIS registration data;
- agency identity;
- remote access capabilities;
- unpatched vulnerabilities in applications and operating systems; or
- applications used by an agency.

13. The system of claim 10, wherein the database is a multi-model database based on non-SQL storage objects.

14. The system of claim 10, wherein the structured data is stored in the database in a columnar manner.

15. The system of claim 10, wherein collecting the publicly available data comprises:
- collecting software packages of varying versions; and
- storing the software packages to an offline repository.

16. The system of claim 10, wherein the task commands are delivered via at least one of:
- keyboard;
- mouse position clicks; or
- Open Source Computer Vision Library.

17. The system of claim 10, wherein the virtual machines emulate a host and network environment.

18. The system of claim 10, wherein running an actor program comprises:
- creating a file to generalize user actions for a specified event type;
- creating an event, wherein the event comprises the specified event type;
- scheduling the event;
- sending a first task of the event to an event executor;
- executing the first event;
- determining a running status of the event; and
- subsequently executing any dependent tasks only if the first task is successful.

19. A computer program product for automating emulations, the computer program product comprising:
- a computer-readable storage medium having program instructions embodied thereon to perform the steps of:
  - collecting publicly available network data over a predefined time interval, wherein the collected network data might comprise structured and unstructured data;
  - converting any unstructured data in the collected network data into structured data;
  - storing the structured data in a database, including both structured data originally in the collected network data and structured data converted from unstructured data in the collected network data;
  - comparing the stored structured data to known network vulnerabilities;
  - creating an emulated network according to the collected network data and the comparison of the stored structured data with known vulnerabilities;
  - creating a number of virtual machines to run on the emulated network;
  - running a number of director programs on the virtual machines;
  - running a number of guest actor programs on the virtual machines, wherein the actor programs imitate real user behavior on the emulated network;
  - delivering, by the director programs, task commands to the guest actor programs to imitate real user behavior; and
  - presenting the imitated behavior to a user via an interface.

20. The computer program product of claim 19, wherein the publicly available network data comprises at least one of:
- user accounts information;
- installed software information;
- domain;
- hostname;
- distinguished name;
- system description;
- operating system;
- IP information;
- listening services;
- main disk file directories; or
- network digital fingerprint information.

21. The computer program product of claim 20, wherein the network digital fingerprint information comprises at least one of:
- exposed ports;
- running network services,
- passive and active DNS names and IP addresses;
- certificate information;
- email addresses;
- active scanning tools to fingerprint externally facing services;
- geolocation;
- WHOIS registration data;
- agency identity;
- remote access capabilities;
- unpatched vulnerabilities in applications and operating systems; or
- applications used by an agency.

22. The computer program product of claim 19, wherein the database is a multi-model database based on non-SQL storage objects.

23. The computer program product of claim 19, wherein the structured data is stored in the database in a columnar manner.

24. The computer program product of claim 19, wherein collecting the publicly available data comprises:
- collecting software packages of varying versions; and
- storing the software packages to an offline repository.

25. The computer program product of claim 19, wherein the task commands are delivered via at least one of:
- keyboard;
- mouse position clicks; or
- Open Source Computer Vision Library.

26. The computer program product of claim 19, wherein the virtual machines emulate a host and network environment.

27. The computer program product of claim 19, wherein running an actor program comprises:
- creating a file to generalize user actions for a specified event type;
- creating an event, wherein the event comprises the specified event type;
- scheduling the event;
- sending a first task of the event to an event executor;
- executing the first event;
- determining a running status of the event; and subsequently executing any dependent tasks only if the first task is successful.

\* \* \* \* \*